Dec. 26, 1944.     J. M. O'MALLEY     2,365,772
UNIVERSAL COUPLING
Filed Feb. 10, 1943     2 Sheets-Sheet 1

Inventor
JOSEPH M. O'MALLEY
By Albert G. Blodgett
Attorney

Dec. 26, 1944. J. M. O'MALLEY 2,365,772
UNIVERSAL COUPLING
Filed Feb. 10, 1943 2 Sheets-Sheet 2
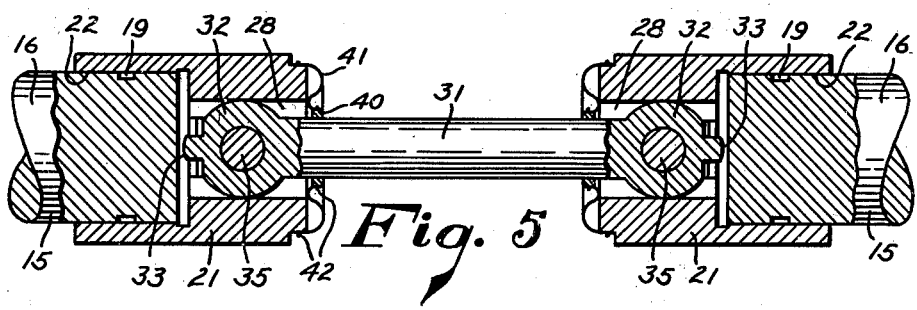
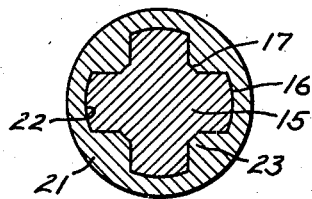
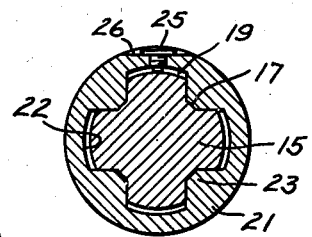
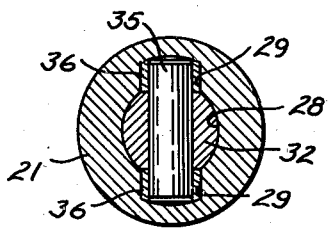
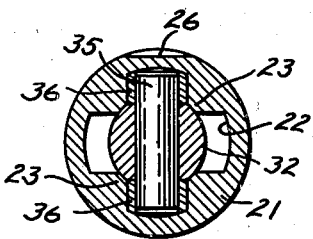
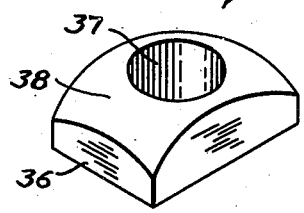
Inventor
JOSEPH M. O'MALLEY
By Albert G. Blodgett
Attorney Patented Dec. 26, 1944

2,365,772

UNITED STATES PATENT OFFICE 2,365,772

UNIVERSAL COUPLING

Joseph M. O'Malley, Worcester, Mass., assignor to Morgan Construction Company, Worcester, Mass., a corporation of Massachusetts Application February 10, 1943, Serial No. 475,329

3 Claims. (Cl. 64—8)

This invention relates to universal couplings, and more particularly to spindle couplings of the type used in rolling mills to connect the pinion shafts with the roll necks.

Rolling mill spindle couplings are subjected to heavy torques, they must operate with considerable misalignment, and they are limited in overall diameter to avoid interference with adjacent couplings. Many of these devices as heretofore constructed have been noisy in operation and subject to severe wear. Many prior couplings have been complicated and expensive to manufacture. Changing of rolls or removal of the spindle has been difficult and time-consuming.

It is accordingly one object of the invention to provide a universal coupling particularly suitable for driving rolling mills and capable of transmitting heavy torque under conditions of appreciable misalignment.

It is a further object of the invention to provide a rolling mill spindle coupling which will operate quietly and under severe operating conditions throughout a long life of service.

It is a further object of the invention to provide a rolling mill spindle coupling which will be comparatively simple and inexpensive to manufacture.

It is a further object of the invention to provide a rolling mill spindle coupling so constructed and arranged that the rolls can easily be changed or the spindle removed in a simple and expeditious manner.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts.

Fig. 5 is a section on the line 5—5 of Fig. 3;

Fig. 6 is a section on the line 6—6 of Fig. 3;

Fig. 7 is a section on the line 7—7 of Fig. 3;

Fig. 8 is a section on the line 8—8 of Fig. 3;

Fig. 9 is a section on the line 9—9 of Fig. 4;

Fig. 10 is a perspective view of a slipper forming a part of the mechanism; and

Fig. 11 is a detail of a ring, on a somewhat enlarged scale.

Figure 1:
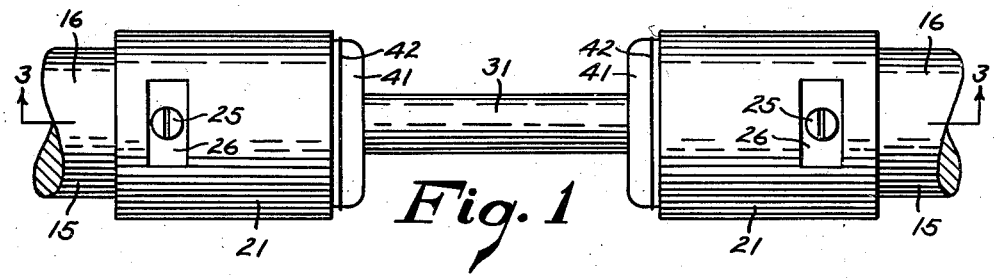
Fig. 1 is an elevation of a spindle coupling in its operative position.

The embodiment illustrated comprises two rotatable elements or shafts 15 which are arranged in approximate alignment and project toward one another, with their adjacent ends spaced apart. One of these elements may be the neck of a rolling mill roll, and the other element may be the pinion shaft which serves to drive the roll. The end portion of each of these elements is provided with a cylindrical outer surface 16 which is interrupted by four lonigtudinally extending grooves 17 equally spaced about the circumference. These grooves are deep, and the adjacent sides of adjacent grooves lie in parallel planes. The cylindrical surface 16 is also interrupted by a comparatively shallow circumferential groove 19 located approximately midway of the length of the grooves 17.

On each of the rotatable elements 15 there is mounted a coupling member 21 having a cylindrical outer surface. Each member 21 has a socket 22 in its outer end shaped to receive the end portion of the adjacent element 15. This socket has a cylindrical inner surface which is interrupted by four longitudinally extending ribs 23 equally spaced circumferentially. These ribs are shaped to fit within the grooves 17 at assembly. In order to hold the member 21 in place during periods of operation, a screw 25 extends radially therethrough into the groove 19, the head of the screw being located in a recess 26 in the coupling member so that it will not project above the cylindrical outer surface thereof.

The inner portion of each coupling member 21 is provided with a central longitudinally extending cylindrical bore 28 co-axial with the socket 22 and communicating therewith. The diameter of this bore is substantially equal to the distance between two diametrically opposed ribs 23 in the socket 22. The cylindrical surface of the bore 28 is interrupted by two longitudinally extending grooves 29 located diametrically opposite one another. The sides of each groove 29 are plane parallel surfaces and the bottom of each groove is a cylidrical surface with a radius substantially equal to that of the socket 22. The width of the grooves 29 is substantially equal to that of the channels between two adjacent ribs 23, and the grooves are aligned with the said channels.

The two coupling members 21 are connected to one another by a spindle 31 having at its opposite ends two enlarged heads 32 which are preferably integral with the spindle. These heads are positioned within the bores 28, and they are preferably in the form of spheres having a diameter substantially equal to that of these bores. On each head 32 there is provided a boss or lug 33 which projects axially into proximity with the adjacent element 15 to prevent appreciable axial displacement of the spindle. A heavy cylindrical pin 35 extends diametrically through each head 32, with the axes of the pins at right angles with the axis of the spindle. The end portions of the pins 35 extend into the grooves 29, and on each of these end portions there is mounted a slipper 36. As shown in Fig. 10, each slipper has a cylindrical bore 37 for the reception of the pin 35 and an outer spherical surface 38, the radius of this surface being substantially equal to that of the socket 22. These slippers have opposed parallel plane surfaces which fit closely against the sides of the grooves 29. Preferably, the pins 35 are a drive or press fit within the heads 32, and the slippers 36 are free to swivel on the pins.

Provision is made for retaining grease within the couplings. For this purpose a pair of rings 40 are slidably mounted on the spindle 31, and each ring is connected to the inner end of the adjacent coupling member 21 by an annular boot 41 of a suitable flexible material, such as a grease-tight fabric, held in place by wires 42. For the purpose of assembly, each ring 40 is made in two diametrically separable parts, as shown in Fig. 11, with the ends of these parts interfitting. In the assembled mechanism the wires 42 will hold the two parts of each ring together.

The operation of the invention will now be apparent from the above disclosure. The spindle 31 and its associated parts will transmit power from one of the shafts 15 to the other smoothly and uniformly even though these shafts may be considerably out of alignment. Under such operating conditions there will be a continuous oscillating movement of the pins 35 within the slippers 36 and a continuous oscillating movement of the slippers 36 within the grooves 29. These movements involve a sliding action between surfaces which are well lubricated and of ample area to avoid excessive concentrations of pressure thereon. These surfaces are entirely enclosed to retain the grease and prevent access of foreign matter. The annular coupling members 21 provide great strength to support the slippers, and they can be made appreciably smaller in outside diameter than the bifurcated members commonly used in prior couplings, which tend to spread apart when subjected to heavy torques.

Figure 2:
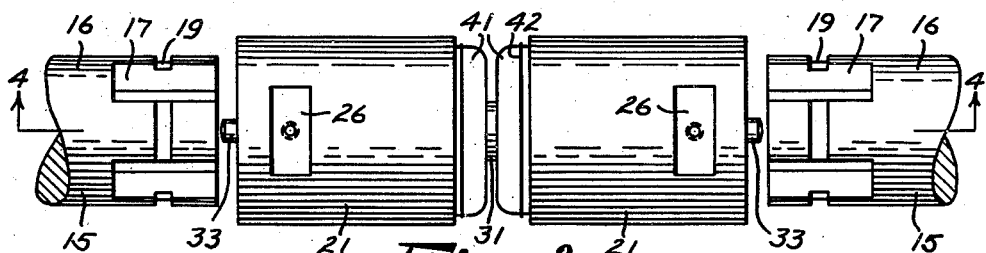
Fig. 2 is an elevation of the coupling disconnected from the shafts at its opposite ends.
Figure 3:
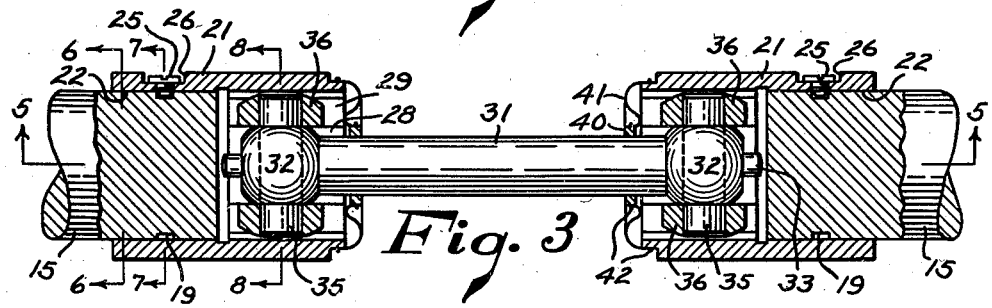
Fig. 3 is a section on the line 3—3 of Fig. 1.
Figure 4:
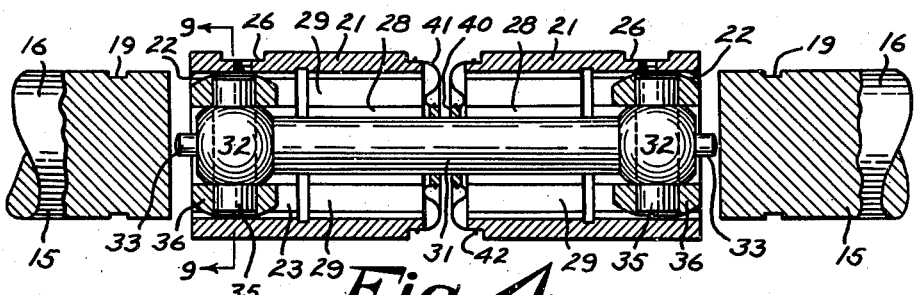
Fig. 4 is a section on the line 4—4 of Fig. 2.

If a roll stand is to be taken out of service or "dummied," the spindle coupling can easily be removed. It is merely necessary to remove the screws 25 and slide the coupling members 21 inwardly toward one another to the positions shown in Figs. 2 and 4. The rings 40 will slide along the spindle 31, and the sockets 22 will receive the spindle heads 32, the slippers 36 being positioned in the channels between the ribs 23 as shown in Fig. 9. The coupling members 21 will now be clear of the roll neck and pinion shaft, so that the spindle and coupling members may all be lifted directly upward without interference. The invention also facilitates the changing of rolls in a roll housing of the open-top type, since it is merely necessary to retract from the roll neck the corresponding coupling member, whereupon the roll can be raised without interference with any of the parts of the coupling.

The invention has relatively few parts, and these are comparatively simple and inexpensive to manufacture. For example, each coupling member 21 can be made of cast steel, with the socket 22, bore 28 and grooves 29 formed in the casting. It is a very simple matter to machine the bore 28 and the grooves 29. In many cases it will be unnecessary to machine the walls of the socket 22, but this can readily be done if desired. It will also be noted that the rotatable elements 15 are of a comparatively simple shape which can be manufactured at relatively low cost.

Having thus described my invention, what I claim as new and desire to secure by Letters Patent is:

1. A universal coupling comprising a coupling member having a socket in its outer end shaped to provide a central cavity and a pair of diametrically opposed longitudinally extending channels, the coupling member also having a central cylindrical bore extending longitudinally from its inner end to the socket, the bore being interrupted by two diametrically opposed grooves which extend longitudinally in alignment with the said channels, a spindle having an enlarged head thereon in the form of a sphere having a diameter substantially equal to that of the bore, the head being located within the bore, a pin extending diametrically through the head at right angles with the spindle axis, and two slippers mounted on the opposite ends of the pin and located within the respective grooves, the said cavity being of sufficient size to receive the head, and the said channels being of sufficient width to receive the slippers as the coupling member is moved inwardly over the spindle.

2. A universal coupling comprising a coupling member having a socket in its outer end with the inner surface thereof interrupted by four longitudinally extending ribs equally spaced circumferentially to form two pairs of opposed channels, the coupling member also having a central cylindrical bore extending longitudinally from its inner end to the socket, the bore being interrupted by two diametrically opposed grooves which extend longitudinally in alignment with two of the said channels, a spindle having an enlarged head thereon in the form of a sphere having a diameter substantially equal to that of the bore, the head being located within the bore, a pin extending diametrically through the head at right angles with the spindle axis, and two slippers mounted on the opposite ends of the pin and located within the respective grooves, the diameter of the bore being substantially equal to the distance between each pair of diametrically opposite ribs, and the width of the channels being substantially equal to the width of the grooves, whereby the socket will receive the head and the channels will receive the slippers as the coupling member is moved inwardly over the spindle.

3. A universal coupling comprising a generally cylindrical coupling member having a socket in its outer end with a cylindrical inner surface interrupted by four longitudinally extending ribs equally spaced circumferentially to form two pairs of opposed channels, the coupling member also having a central cylindrical bore extending longitudinally from its inner end to the socket, the bore being interrupted by two diametrically opposed grooves which extend longitudinally in alignment with two of the said channels, the bottom of each groove being a cylindrical surface with a radius substantially equal to that of the socket, a spindle having an enlarged head thereon in the form of a sphere having a diameter substantially equal to that of the bore, the head being located within the bore, a cylindrical pin extending diametrically through the head at right angles with the spindle axis, and two slippers mounted on the opposite ends of the pin and located within the respective grooves, the slippers having plane surfaces in contact with the sides of the grooves and spherical surfaces in contact with the bottoms of the grooves, the diameter of the bore being substantially equal to the distance between each pair of diametrically opposite ribs, and the width of the channels being substantially equal to the width of the grooves, whereby the socket will receive the head and the channels will receive the slippers as the coupling member is moved inwardly over the spindle.

JOSEPH M. O'MALLEY.